Jan. 1, 1952

A. GLAZER ET AL 2,581,251

TELEPHONE BOOTH

Filed Aug. 9, 1949

5 Sheets-Sheet 1

INVENTORS: A. GLAZER
H. F. HOPKINS
N. R. STRYKER
BY

ATTORNEY

Jan. 1, 1952 A. GLAZER ET AL 2,581,251

TELEPHONE BOOTH

Filed Aug. 9, 1949 5 Sheets-Sheet 2

INVENTORS: A. GLAZER
H. F. HOPKINS
N. R. STRYKER
BY
[signature]
ATTORNEY

INVENTORS: A. GLAZER
H. F. HOPKINS
N. R. STRYKER
BY
ATTORNEY

Jan. 1, 1952 A. GLAZER ET AL 2,581,251

TELEPHONE BOOTH

Filed Aug. 9, 1949 5 Sheets-Sheet 4

INVENTORS: A. GLAZER
H. F. HOPKINS
N. R. STRYKER

BY

ATTORNEY

INVENTORS: A. GLAZER
H. F. HOPKINS
N. R. STRYKER
BY [signature]
ATTORNEY

Patented Jan. 1, 1952

2,581,251

UNITED STATES PATENT OFFICE 2,581,251

TELEPHONE BOOTH

Allan Glazer, Summit, Norman R. Stryker, East Orange, and Harris F. Hopkins, Chatham, N. J., assignors to Bell Telephone Laboratories, Incorporated, New York, N. Y., a corporation of New York Application August 9, 1949, Serial No. 109,356

1 Claim. (Cl. 179—1)

This invention relates to telephone booths.

One general object of this invention is to improve the service and the quality of speech transmission at telephone booths.

More specific objects of this invention are to simplify the operations involved in making a call from a telephone booth, to assure high quality speech transmission and reception, to enable control by the caller at the booth of the level of reception, and to affect automatic resetting of this level to a preassigned normal value upon completion of each telephone conversation.

One feature of this invention pertains to a telephone booth equipped with distant talking instruments, specifically a microphone and a loudspeaker, in which the intercoupling between the instruments is reduced to a minimum.

Another feature of the invention relates to the provision of amplifying means, associated with the loudspeaker, under control of the occupant of the booth, for controlling the output level of the loudspeaker during the period in which the instruments are in use and switching means also under control of the booth occupant for activating the microphone and loudspeaker, the switching means automatically restoring the manually operated volume control to a normal position when said instruments are deactivated by the operation of the switching means at the end of the conversation.

A further feature of the invention involves the provision of a volume control mechanism and an activating switch in which the volume control is normally maintained at a low level or normal position during the period that the activating switch is in its disconnect position but will remain in its adjusted position after the activating switch has been moved to the connect position and will be restored to its neutral or normal position when the activating switch has been moved to its disconnect position.

In accordance with still another feature of this invention, the loudspeaker, microphone and seat are physically associated in prescribed relation to assure substantially optimum speech transmission and reception for a variety of positions of the telephone user relative to the telephone instruments.

A telephone booth illustrative of one embodiment of this invention comprises a plurality of wall sections secured together in angular relation by a roof section and a floor section. The interior surfaces of the wall sections are acoustically treated to minimize sound reflections and certain sections have mounted thereon a suitable seat member and a shelf member. Mounted in one of the wall sections of the booth, in definite prescribed spaced relation with respect to the seat is a built-in loudspeaker and microphone, which are positioned in prescribed space relation with respect to each other.

A manually operated switch, under the control of the occupant of the booth, is provided for controlling the activation of the loudspeaker and microphone which are in circuit with suitable amplifying means. Associated with the switch, amplifier and loudspeaker is a manually operated volume control mechanism for adjusting the output level of the loudspeaker, which when in its normal or neutral position provides sufficient gain for normal use. The switch is connected to the volume control mechanism in such a manner that when the switch is restored to its off or disconnect position the volume control automatically returns to its neutral or normal position.

Other features of the invention will be apparent from the following detailed description when read with reference to the drawings in which.

Figure 1:
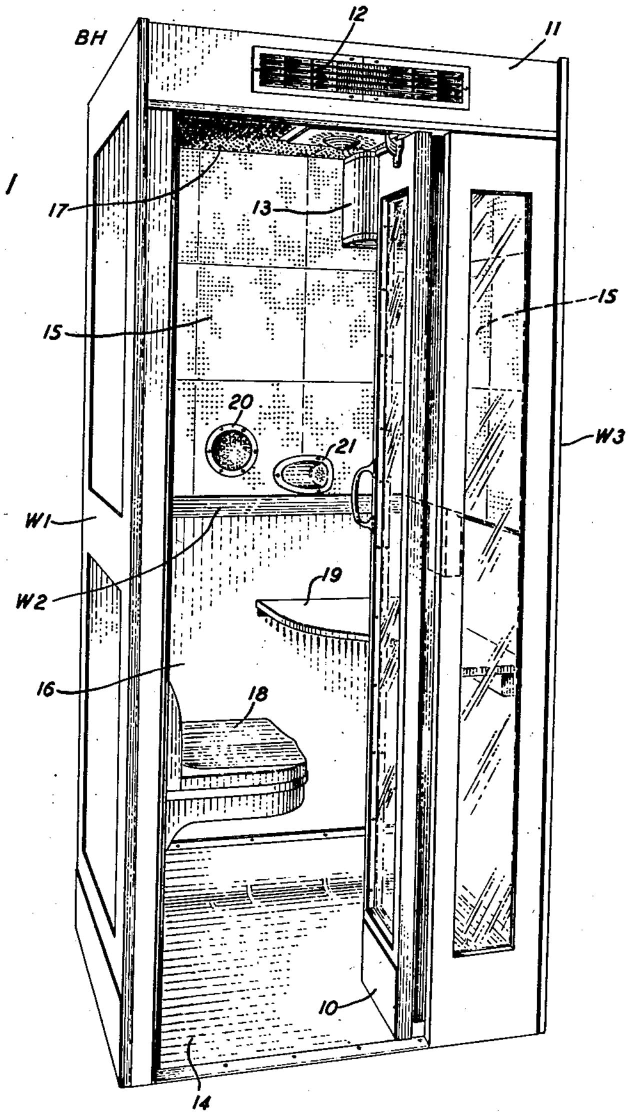
Fig. 1 is an assembly view in perspective of a booth illustrative of this invention with the door folded back and disclosing the space relation of the seat, loudspeaker and microphone.

In the telephone booths BH shown in Fig. 1, the walls $W_1$, $W_2$ and $W_3$ cooperate to provide a structure having a substantially square cross-section, and are provided at their edges with tongue and grooves for ready assembly and disassembly. A folding door 10 is provided for gaining access to the booth.

A roof section 11 is secured to the top portion of the wall sections $W_1$, $W_2$ and $W_3$ and is provided with a suitable air inlet 12 which cooperates with the ventilator 13 for supplying fresh air to the interior of the booth when the door 10 is in a closed position.

The base of the structure comprises a supporting surface to which the side walls $W_1$, $W_2$ and $W_3$ are secured and is covered with a suitable floor covering material 14.

Figure 5:
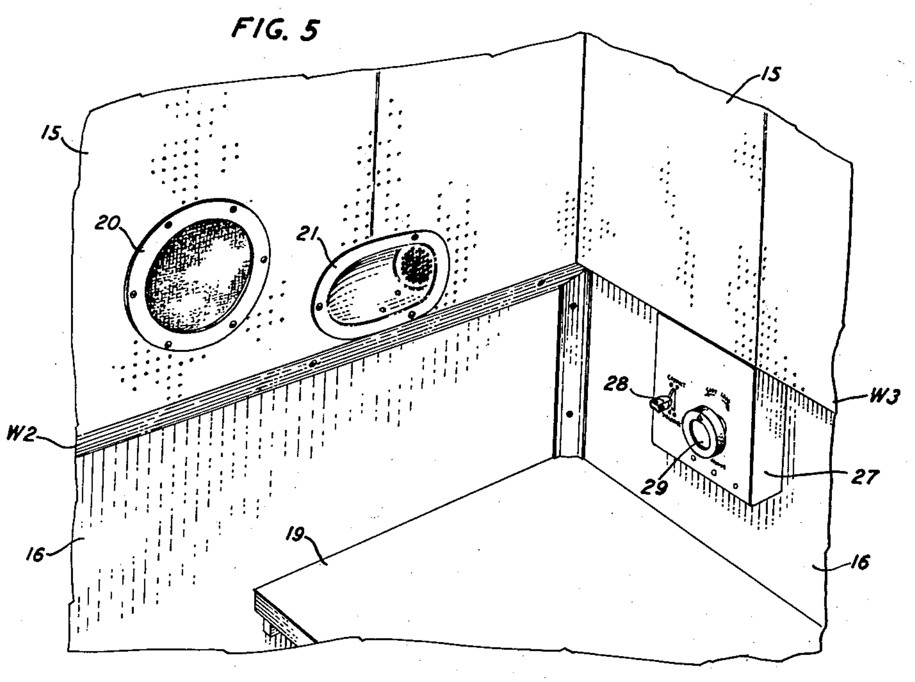
Fig. 5 is a fragmentary perspective view of the back and side walls of the booth illustrating the loudspeaker, microphone, activating switch and volume control.
Figure 6:
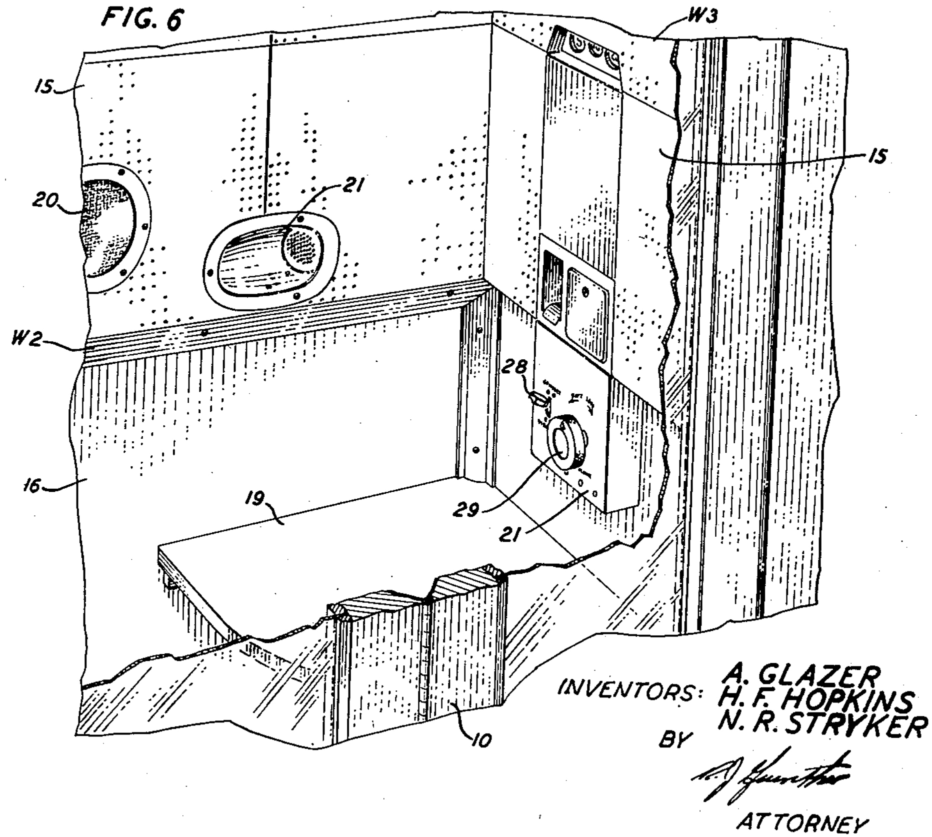
Fig. 6 is a fragmentary view partly in section showing another embodiment of the invention in which a coin collector is flush mounted in the side wall section of the booth.

As shown in Figs. 1, 5 and 6, the interior upper portions of the walls, $W_1$, $W_2$ and $W_3$ are provided with a sound absorbent acoustic wall material 15 covering approximately one-half of the wall surface. The lower half of the walls is covered with a suitable metallic lining material 16.

The roof section 7 is provided with a ceiling 17 covered with a material similar to the upper portions of the side walls $W_1$, $W_2$ and $W_3$.

Mounted on the interior of the booth BH and secured to the side wall section $W_1$, at proper chair height, is a seat member 18 and mounted in juxtaposition with respect to the seat member 18, on the back wall section $W_2$ and the side wall section $W_3$ is a suitable shelf member 19.

Figure 2:
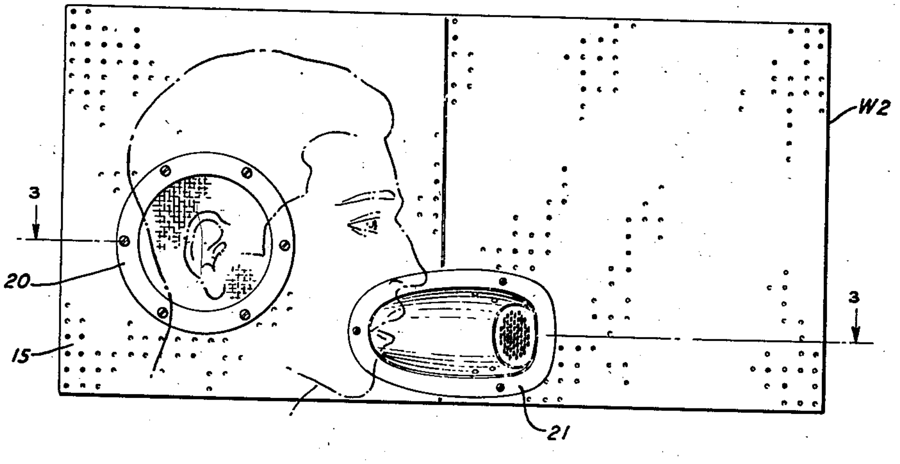
Fig. 2 is a fragmentary view of the back wall section of the booth showing the position of the loudspeaker and microphone with respect to the mouth and ear of a normal person.
Figures 3, 4:
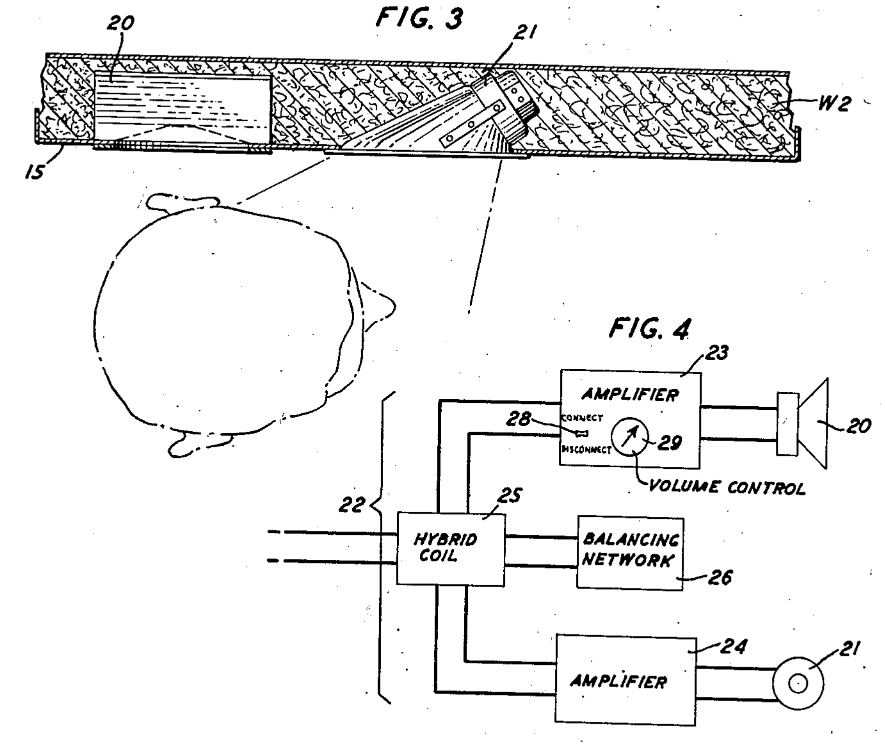
Fig. 3 is a fragmentary sectional view taken on line 3—3 of Fig. 2.
Fig. 4 is a schematic illustrating the circuit arrangement for the various instruments in the booth.

Located on the back wall section $W_2$ and mounted flush therewith as shown in Fig. 1, and more in detail in Figs. 2, 3, 5 and 6, are telephone instruments specifically a loudspeaker 20 and a microphone 21. These two instruments are so positioned with respect to each other and with respect to the seat that an average person, occupying the seat, will have his head positioned substantially, as shown in Figs. 2 and 3 with his mouth and ear in proper space relation with respect to the instruments, and so that various inclinations of the body and head, limited by the confines of the booth walls, will not impair the efficient reception or transmission of intelligence, as shown by the several curves in Fig. 11 and Fig. 12.

Figure 11:
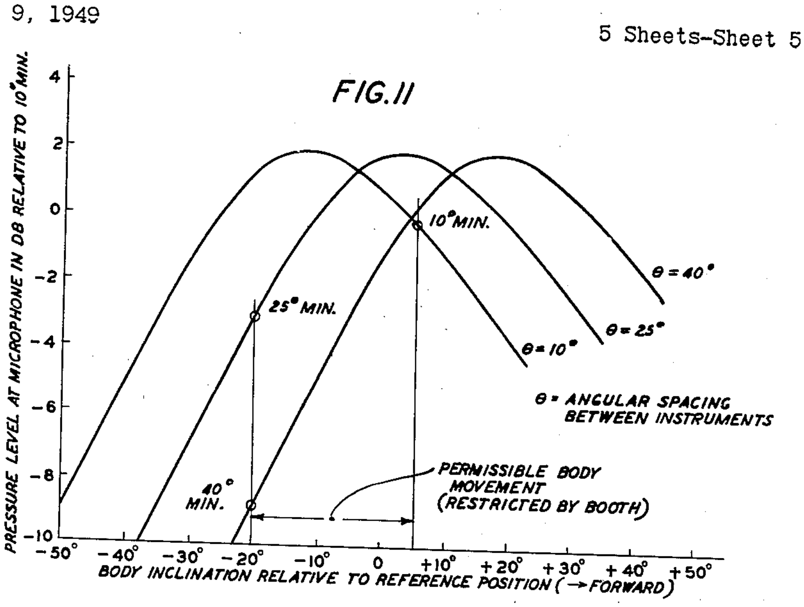
Fig. 11 is a graph showing the sound pressures on the diaphragm of the microphone for various inclinations of the head.

In Fig. 11 there is shown the relative speech pressure levels at the microphone 21 for a range of inclinations of the body relative to the reference position, which is the position a person will assume when seated upright in the booth, his head assuming the position shown in Figs. 2 and 3.

Each curve in Fig. 11 is for a given angular position of the microphone 21 relative to the loudspeaker 20. The spacing is expressed in degrees with the microphone on the arc of a 26-inch radius which is the projected arc of the talker's lips. There are shown in this figure, three different locations. However, intermediate points are easily determined by sliding the plot along the base line.

The range of body movement permitted by the boundaries of a specific telephone booth are indicated and the minimum speech pressure level at the microphone 21 within this range is indicated for each spacing. In operation, it is the minimum pressure level encountered which determines the maximum amount of gain required in the associated amplifier. These minimum pressure levels relative to that for the ten-degree spacing are as shown by curve B of Fig. 12.

Figure 12:
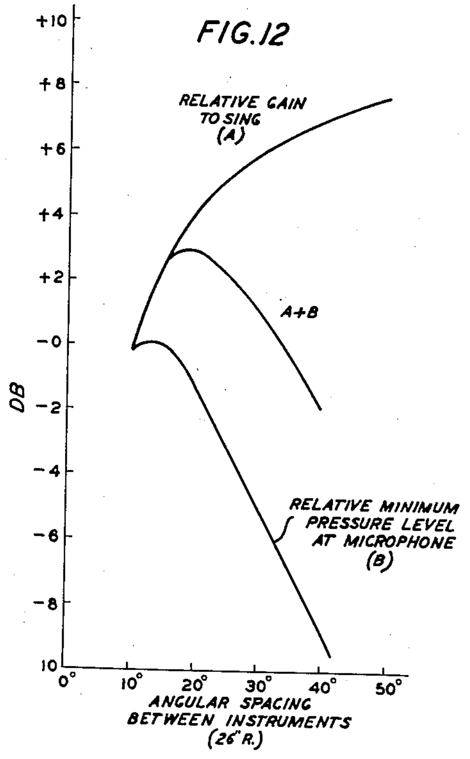
Fig. 12 is a graph showing the relative gain which will cause singing and the minimum speech sound pressure levels at the microphone with respect to the angular separation between the microphone and loudspeaker.

The amount of gain required to produce singing for the range of instrument spacings, relative to the gain for the ten-degree spacing, is indicated by curve A of Fig. 12. This curve defines the maximum amount of useful gain which could be made available for a given instrument spacing, and the algebraic sum of curves A and B of this figure, would be the relative overall transmission level which could be obtained over the range indicated. A maximum is clearly observed for the spacing of about 18 degrees.

Mounted underneath the shelf 19 as shown in Fig. 1, is a housing 22 which contains suitable amplifiers 23 and 24 for the loudspeaker 20 and microphone 21, as shown in the schematic of Fig. 4, together with a hybrid coil 25 and a balancing network 26.

Figure 7:
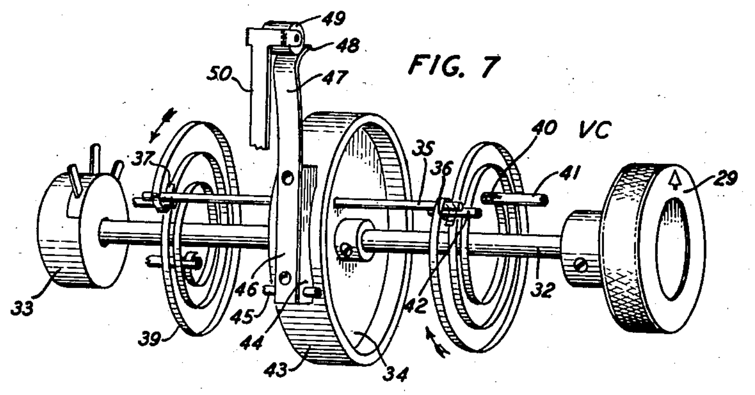
Fig. 7 is an exploded view of the preferred form of volume control mechanism.
Figure 10:
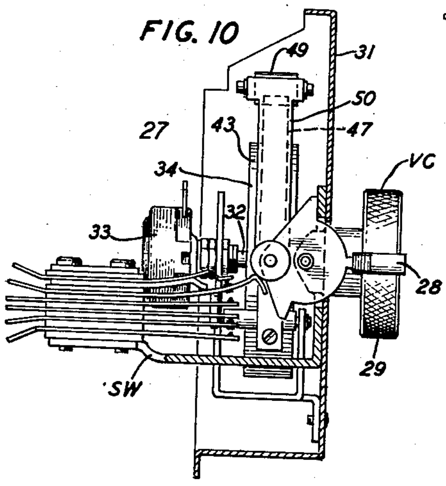
Fig. 10 is a sectional view taken on line 10—10 of Fig. 9.
Figure 9:
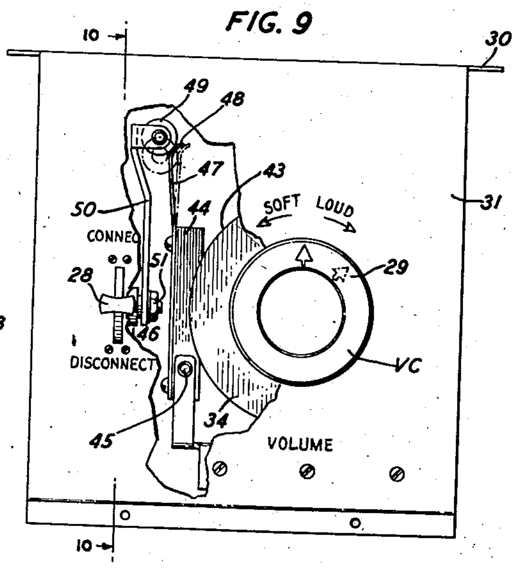
Fig. 9 is a front elevational view of the activating switch and volume control with a portion of the front panel broken away.

Mounted on the wall $W_3$ of the booth BH above the shelf 19 and associated with the circuit for the amplifiers 22 and 24 and the instruments 20 and 21, is a combined activating switch and volume control unit 27, as shown more in detail in Figs. 7, 9 and 10, for controlling the instruments and regulating the volume of the loudspeaker.

The combined unit in its perferred embodiment comprises a volume control mechanism shown in Fig. 7 and a suitable switch mechanism shown in Figs. 9 and 10.

The activating switch SW and the volume control VC are under the control of the occupant of the booth and the switch SW functions to energize the telephone circuit and the volume control VC functions to regulate the volume of the loudspeaker 20. Thus, when an occupant enters the booth BH he will move the lever 28, of the switch SW from its disconnect position to its connect position; this will cause the energization of the instruments 20 and 21 in a manner similar to and using well-known circuit arrangements as when the receiver of a pay station telephone is lifted from its hook. After the circuit is completed and is ready for use, the volume control knob 29 may be adjusted in either a clockwise or a counterclockwise direction to increase or decrease the volume of the loudspeaker 21.

Means are provided in the combined activating switch and volume control unit 27, which will be described in detail hereinafter, for restoring the volume control to its normal or low volume position when, at the completion of the call, the activating switch lever 28 is returned to its disconnect position as shown in Figs. 5, 9 and 10.

As heretofore referred to and as shown in Figs. 6, 7, 9 and 10, there is provided a combined activating switch SW and volume control VC which are mechanically associated so that when the lever 28 of activating switch SW is in its connect position as shown in Fig. 6, the volume control knob 29 may be turned and biased either in a clockwise or a counterclockwise direction, but when the switch lever 28 is in its disconnect position, as shown in Figs. 9 and 10 the volume control knob will be restored to a normal low level position, and will be so maintained as long as the lever 28 is in its disconnect position thereby preventing the volume control from being left at an undesirable setting of either a low level or high level, by the former occupant of the booth.

The preferred form of combined actuating switch and volume control is shown in Figs. 7, 9 and 10 and comprises a housing 30 having a front panel 31 upon which are mounted the switch SW and the volume control VC which are mechanically interconnected.

The preferred form of volume control, shown in detail in Fig. 7, comprises a shaft 32 having a control knob 29 mounted on one end thereof and a suitable slide wire resistance unit 33 mounted on the other. Mounted fixedly on the shaft 32 midway between the knob 29 and the resistance unit 33 is the drum 34 which will rotate when the knob 29 is operated. Passing through the wall portion of the drum 34 is a longitudinally extending rod member 35; this rod extends an equal distance on each side of the drum and is in engagement with the bent over end portions 36 and 37 of the coiled springs 38 and 39. The spring 38 is right-hand wound and has its other end 40 secured to the fixed pin 41, which is secured to the casing 30 in any suitable manner. A second pin 42, which serves to prevent the spring 38 from uncoiling, is positioned adjacent the end of the rod 35 and is in engagement with the free end 36 of the spring 38. Thus when the knob 29 is turned clockwise to adjust the resistance unit to increase the volume of the instrument connected thereto the drum will also turn clockwise and cause the convolutions of the spring 38 to tighten as the end 36 leaves the pin 42 and is carried around by means of the rod 35 thus applying a counterclockwise tension on the drum 34 and the shaft 33.

In order that the volume control unit will be maintained in a fixed or adjusted position, a suitable brake member engages the outer face 43 of the drum 34. This brake member comprises a shoe 44, shaped to fit the contour of the drum face and is pivotally mounted by a suitable support 45. The shoe 44 has secured to its outer surface a vertically extending member 46 which is provided at its free end 47 with a bent portion 48 which is in engagement with a roller 49 mounted on the end of a second vertically extending arm member 50, which is mechanically connected to the switch lever 28 by means of the linkage 51. Thus, when the lever 28 is in its disconnect position as shown in Figs. 9 and 10 the roller 49 will be positioned on the low portion of the free end 48 and no pressure will be exerted on the brake shoe 44; however, when the switch lever 28 is moved to its connect or activating position the roller 49 will ride down on the surface of the member 46 as shown in dot and dash lines in Fig. 9 and exert pressure on the brake shoe 44 thereby maintaining the drum 34 and its associated parts in their adjusted position. The brake shoe will be under the tension of the coil spring 38 if turned clockwise to increase the volume of the instrument connected thereto or under the tension of the spring 39 which acts in the same manner as spring 38 but in a counterclockwise direction. Thus it will be readily observed that as long as the switch lever 28 is maintained in its connect position the volume control will be maintained in its adjusted position either in a clockwise or a counterclockwise direction but upon the restoration of the switch lever 28 to its deactivated or disconnect position the brake 44 will be released and the volume control unit will be restored to its low level or normal position under the influence of either the spring 38 or 39 depending upon whether or not the volume control knob 29 has turned either in a clockwise or a counterclockwise direction.

Figure 8:
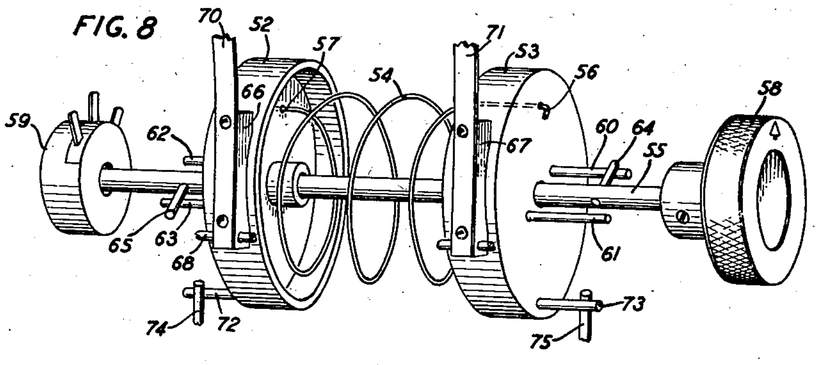
Fig. 8 is an exploded view of a modified form of volume control mechanism.

In Fig. 8 there is shown a modified form of volume control which operates in a manner similar to the volume control as shown in Figs. 7, 9 and 10 but differs structurally in that it is provided with two drums 52 and 53 and utilizes a single spring 54 which is coiled around the shaft 55 and has its end portions 56 and 57 secured in the faces of the drums 52 and 53. Mounted on the end of the shaft 55 in a manner similar to the preferred form of volume control shown in Fig. 7, there is mounted on one end of the shaft a volume control knob 58 and on the other end a slide wire resistance unit 59.

The drums 52 and 53 are rotatably mounted on the shaft 55 and are provided with suitable pins 60, 61, 62 and 63 which extend longitudinally and are adapted to engage axially extending pins 64 and 65 on a shaft 55, when the knob 58 is rotated to cause the operation of the resistance unit 59 through the medium of the shaft 55.

Thus it will be seen that when the knob 58 is rotated in a clockwise direction the pin 64 will engage the pin 60 and cause the drum 53 to be rotated and since the ends of the coil spring 54 are attached to the drums 53 and 52 and the pin 63 of the drum 52 is in engagement with the pin 65 it will cause the spring 54 to be coiled clockwise and exert a counterclockwise tension on the drum 53 and in a similar manner when the control knob 58 is operated in a counterclockwise direction the spring 54 will be tensioned in a counterclockwise direction due to the fact that the pin 64 will engage the stop 61 and the pin 65 will engage the pin 63 and cause the drum 52 to operate in a counterclockwise direction thereby exerting a clockwise tension on the drum 52.

Positioned on the periphery of each of the drum members 52 and 53 are brake members similar to that disclosed in Fig. 7. These brake members comprise two shoes 66 and 67 which are pivotally supported at their lower end by means of suitable pins 68 and 69. These members have secured to their outer faces vertical extending arms 70 and 71 and are structurally the same as the member 46 shown in Fig. 7, operate in the same manner and are mechanically interconnected to the activating switch SW and controlled by the operation of the switch lever 28.

Suitable stop pins 72 and 73 on the drums 52 and 53 cooperate with the pins 74 and 75 to limit the amount of movement of the respective drums.

In Fig. 6 there is shown a modification of the booth structure shown in Fig. 1 in which a coin collector is flush mounted in the booth for use in those instances where a non-attended booth is installed. This coin collector operates in the well-known manner with the activating switch 28 being substituted for the usual receiver switch hook.

While there has been shown and described preferred embodiments of the invention it is to be understood that various changes and modifications may be made therein without departing from the spirit of the invention.

What is claimed is:

A telephone booth having three stationary walls, a seat member secured to one of said walls at a predetermined height, a loudspeaker and a microphone mounted in predetermined proximity to one another within a second of said walls so that an outer surface of the loudspeaker and microphone are substantially flush with the surface of the second wall and at such a predetermined distance relative to said seat that an occupant of the seat member will have the said loudspeaker and microphone in proper spaced relation with respect to his ear and mouth, whereby various predetermined inclinations of the body and head with respect to said seat member and said second wall will still provide efficient reception and transmission of intelligence.

ALLAN GLAZER.
NORMAN R. STRYKER.
HARRIS F. HOPKINS.

REFERENCES CITED

The following references are of record in the file of this patent:

UNITED STATES PATENTS

| Number | Name | Date |
|---|---|---|
| 1,773,776 | Grisson | Aug. 26, 1930 |
| 1,979,072 | Kuntz | Oct. 30, 1934 |
| 2,277,907 | Goodale | Mar. 31, 1942 |
| 2,320,726 | Herckmans | June 1, 1943 |
| 2,424,348 | Casson | July 22, 1947 |

FOREIGN PATENTS

| Number | Country | Date |
|---|---|---|
| 11,265 | Great Britain | Sept. 22, 1885 |